(12) United States Patent  (10) Patent No.: US 9,030,409 B2
Kim et al.  (45) Date of Patent: May 12, 2015

(54) DEVICE FOR TRANSMITTING AND RECEIVING DATA USING EARPHONE AND METHOD FOR CONTROLLING THE SAME

(71) Applicant: LG Electronics Inc., Seoul (KR)

(72) Inventors: Jihwan Kim, Seoul (KR); Jungbin Yim, Seoul (KR); Sihwa Park, Seoul (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 13/856,093

(22) Filed: Apr. 3, 2013

(65) Prior Publication Data

US 2014/0198026 A1  Jul. 17, 2014

Related U.S. Application Data

(60) Provisional application No. 61/751,262, filed on Jan. 11, 2013.

(30) Foreign Application Priority Data

Feb. 18, 2013  (KR) ........................ 10-2013-0017042

(51) Int. Cl.
    *G09G 5/00*  (2006.01)
    *G06F 3/00*  (2006.01)
    *H04R 1/10*  (2006.01)

(52) U.S. Cl.
    CPC  *G06F 3/002* (2013.01); *H04R 1/10* (2013.01); *H04R 1/1041* (2013.01); *H04R 2420/05* (2013.01)

(58) Field of Classification Search
    CPC ..... G06F 1/1626; H04R 5/033; H04R 5/0335
    USPC ............................ 345/169; 381/396, 150, 151
    See application file for complete search history.

(56) References Cited

U.S. PATENT DOCUMENTS 6,772,331 B1  8/2004  Hind et al.
8,213,630 B2 *  7/2012  Yoshizawa et al. ............. 381/81
(Continued)

FOREIGN PATENT DOCUMENTS

KR  10-1142906 B1  5/2012

OTHER PUBLICATIONS

Ashbrook et al., "Nenya: subtle and eyes-free mobile input with a magnetically-tracked finger ring," In Proc. CHI '11, ACM Press, May 7-12, 2011, (4 pages).

(Continued)

*Primary Examiner* — Jennifer Nguyen
(74) *Attorney, Agent, or Firm* — Birch, Stewart, Kolasch & Birch, LLP

(57) ABSTRACT

According to an embodiment, a method for controlling a portable device connected to an earphone having a coil includes detecting removal of one of left and right units of the earphone worn by a user, generating an electromagnetic pattern corresponding to an Identifier(ID) of the portable device at the removed unit of the earphone, and receiving data from the external device in correspondence with the ID of the portable device. According to an embodiment, a method for controlling a display device includes displaying a Graphic User Interface on a display unit, sensing an earphone within a detection area of the display unit, sensing an electromagnetic pattern of the earphone within a detection area of the display unit, acquiring an ID of an external device connected to the earphone from the sensed electromagnetic pattern, and transmitting data to the external device identified by the acquired ID of the external device.

19 Claims, 11 Drawing Sheets

(56) References Cited

U.S. PATENT DOCUMENTS

| | | | |
|---|---|---|---|
| 2004/0131174 A1 | 7/2004 | Lucey et al. | |
| 2004/0136552 A1 | 7/2004 | Bendixen et al. | |
| 2007/0141987 A1 | 6/2007 | Weinans et al. | |
| 2008/0025548 A1 | 1/2008 | Nishimura et al. | |
| 2011/0163944 A1 | 7/2011 | Bilbrey et al. | |
| 2014/0086438 A1* | 3/2014 | Tachibana et al. | 381/309 |
| 2014/0219484 A1* | 8/2014 | Zellner | 381/311 |
| 2014/0233752 A1* | 8/2014 | Seo et al. | 381/74 |

OTHER PUBLICATIONS

Bianchi et al., "Designing tangible magnetic appcessories," In Proc. TEI '13, Feb. 10-13, 2013, (4 pages).

Butler et al., "SideSight: multi-"touch" interaction around small devices," In Proc. UIST '08, 2008, (4 pages).

Chan et al., "CapStones and ZebraWidgets: sensing stacks of building blocks, dials and sliders on capacitive touch screens," Session: Dimensions of Sensory Interaction, In Proc. CHI '12, May 5-10, 2012, pp. 2189-2192.

Edelmann et al., "Tangoscope: a tangible auto device for tabletop interaction," In Proc. INTERACT'11, IFIP 2011, 8 pages.

Harrison et al., "Abracadabra: wireless, high-precision, and unpowered finger input for very small mobile devices," In Proc. UIST'09, ACM Press, Oct. 4-7, 2009, (4 pages).

Hong et al., "Demo abstract: SEPTIMU—continuous in-situ human wellness monitoring and feedback using sensors embedded in earphones," In Proc. IPSN'12, ACM Press, Apr. 16-20, 2012, pp. 159-160.

Jacobsson et al., "Mobile ActDresses: programming mobile devices by accessorizing," In Proc. CHI '12, May 5-10, 2012, (4 pages).

Klemmer et al., "How bodies matter: five themes for interaction design," In Proc. DIS'06, Jun. 26-28, 2006, 10 pages.

Liang et al., "GaussSense: attachable stylus sensing using magnetic sensor grid," In Proc. UIST'12, ACM Press, Oct. 7-10, 2012, pp. 319-325.

Matsumura et al., "Universal earphones: earphones with automatic side and shared use detection," In Proc. IUI'12, , ACM Press, Feb. 14-17, 2012 (2 pages).

Wiethoff et al., "Sketch-a-TUI: low cost prototyping of tangible interactions using cardboard and conductive ink," In Proc. TEI'2012, ACM Press, Feb. 19-22, 2012, (4 pages).

Yu et al., "TUIC: Enabling tangible interaction on capacitative multi-touch display," CHI '11, ACM Press, May 7-12, 2011, pp. 2995-3004.

* cited by examiner

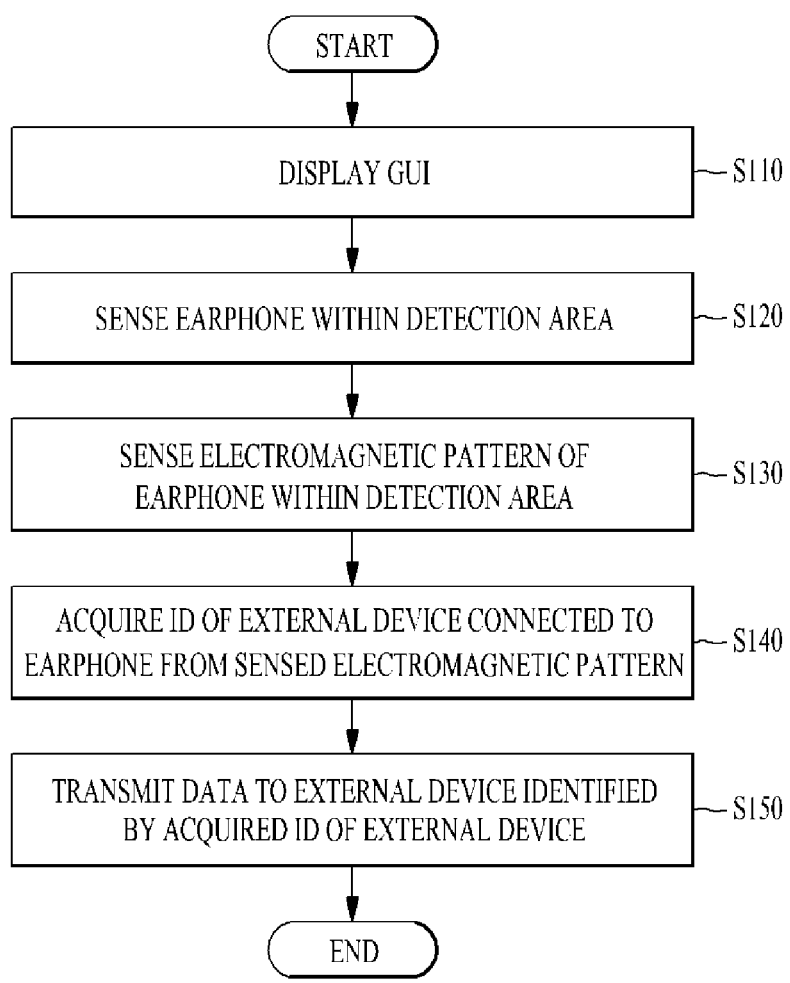

DEVICE FOR TRANSMITTING AND RECEIVING DATA USING EARPHONE AND METHOD FOR CONTROLLING THE SAME

Pursuant to 35 U.S.C. §119(e), this application claims the benefit of the U.S. Provisional Application No. 61/751,262, filed on Jan. 11, 2013 and Pursuant to 35 U.S.C. §119(a) the benefit of Korean Patent Application No. 10-2013-0017042, filed on Feb. 18, 2013, which are hereby incorporated by reference as if fully set forth herein.

BACKGROUND OF THE DISCLOSURE

1. Field of the Disclosure

The disclosure relates to a device for transmitting and receiving data, and more particularly, to a first device for transmitting its Identifier (ID) through an earphone and receiving data and a second device for identifying the first device by a signal generated from the earphone and transmitting data to the first device.

2. Discussion of the Related Art

Along with the proliferation of portable devices with enhanced portability, a user may carry his or her portable device, when going out. The user can receive various services using applications or data stored in the portable device. Further, the user can receive content from a network or an external device through the portable device.

To receive content from an external device, the portable device should be connected to the external device wirelessly or wiredly. For example, after the portable device is connected to the external device in conformance to a wireless access standard such as Bluetooth, etc., they can exchange data with each other. Conventionally, each of the portable device and the external device should identify the other device by the ID of the other device and enter a password in a setting menu, prior to connection setup.

SUMMARY OF THE DISCLOSURE

The disclosure is intended to provide a device for identifying the other device and transmitting and receiving data using an earphone and a method for controlling the same. Particularly, the disclosure needs to provide a method for connecting two devices to each other by means of an earphone, instead of a connection scheme using a complicated setting menu.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method for controlling a portable device connected to an earphone having a coil includes detecting removal of one of left and right units of the earphone from an ear of a user through a sensor unit, generating an electromagnetic pattern corresponding to an Identifier (ID) of the portable device at the removed unit of the earphone using a controller, and receiving data from the external device in correspondence with the ID of the portable device through a communication unit.

In another aspect of the disclosure, a method for controlling a display device includes displaying a Graphic User Interface (GUI) on a display unit, sensing an earphone within a detection area of the display unit through a sensor unit, sensing an electromagnetic pattern of the earphone within a detection area of the display unit through an electromagnetic pattern sensing unit, acquiring an ID of an external device connected to the earphone from the sensed electromagnetic pattern using a controller, and transmitting data to the external device identified by the acquired ID of the external device through a communication unit.

It is to be understood that both the foregoing general description and the following detailed description of the disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 10 is a flowchart illustrating a method for controlling the digital device according to an embodiment.

DETAILED DESCRIPTION OF THE DISCLOSURE

Embodiments will be described in detail with reference to the attached drawings and contents shown in the attached drawings. However, the scope of what is claimed is not limited or restricted by the embodiments.

Although the terms used in the disclosure are selected from generally known and used terms, the terms may be changed according to the intention of an operator, customs, or the advent of new technology. Some of the terms mentioned in the disclosure have been selected by the applicant at his or her discretion, the detailed meanings of which are described in relevant parts of the description herein. Therefore, the disclosure must be understood, not simply by the actual terms used but by the meanings of each term lying within.

In the disclosure, the term 'portable device' covers at least one of a smart phone, a smart pad, a music player, a tablet PC, and a laptop computer. The term 'display device' covers at least one of a smart phone, a smart pad, a tablet PC, a kiosk, a monitor, a wall display, a music player, a desktop computer, a smart table, a TV, and a laptop computer.

Figure 1:
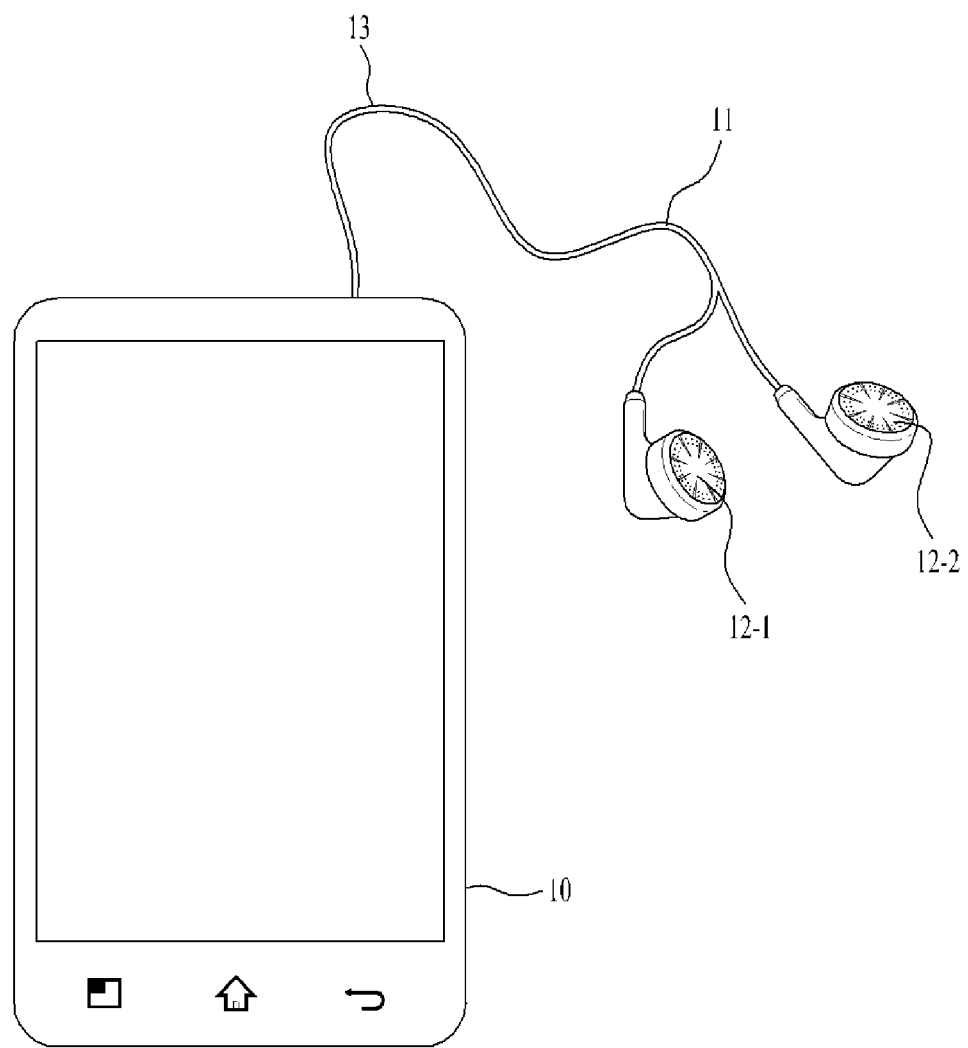
FIG. 1 illustrates a portable device according to an embodiment.

FIG. 1 illustrates a portable device according to an embodiment. A portable device 10 may be connected to an earphone 11. The earphone 11 connected to the portable device 10 may include a left unit 12-1 for outputting left sound of stereo sound, a right unit 12-2 for outputting right sound of the stereo sound, and a cable 13 for connecting the portable device 10 to the units 12-1 and 12-2.

The portable device 10 may output sound through the earphone 11 connected to the portable device 10. The portable device 10 may output sound by applying AC to the units 12-1 and 12-2 through the cable 13 of the earphone 11. Each of the units 12-1 and 12-2 of the earphone 11 may include a coil and a magnet. The portable device 10 may output sound by applying alternating current(AC) to the coils of the units 12-1 and 12-2 in the earphone 11.

The portable device 10 may generate an electromagnetic pattern using the earphone 11 connected to the portable device 10. The portable device 10 may output the electromagnetic pattern by applying direct current(DC) to the units 12-1 and 12-2 through the cable 13 of the earphone 11. The portable device 10 may output the electromagnetic pattern by applying DC to the coils of the units 12-1 and 12-2 through the cable 13 of the earphone 11. The portable device 10 may output a different electromagnetic pattern by changing at least one of the generation period, duration, and magnitude of DC.

FIG. 2 illustrates a method for applying DC to the earphone of the portable device according to an embodiment. The portable device may apply DC to the earphone through a battery. The portable device may change at least one of the generation period, duration, and magnitude of the current supplied to the earphone. In FIG. 2, the vertical axis may represent the magnitude of DC and the horizontal axis may represent time. For example, the unit of the vertical axis may be a current unit mA, and the unit of the horizontal axis may be a time unit, msec or a unit time. The portable device may generate a DC pattern by applying or blocking DC to the earphone over time, and the coils of the earphone may generate an electromagnetic pattern according to the DC pattern.

Figure 2A:
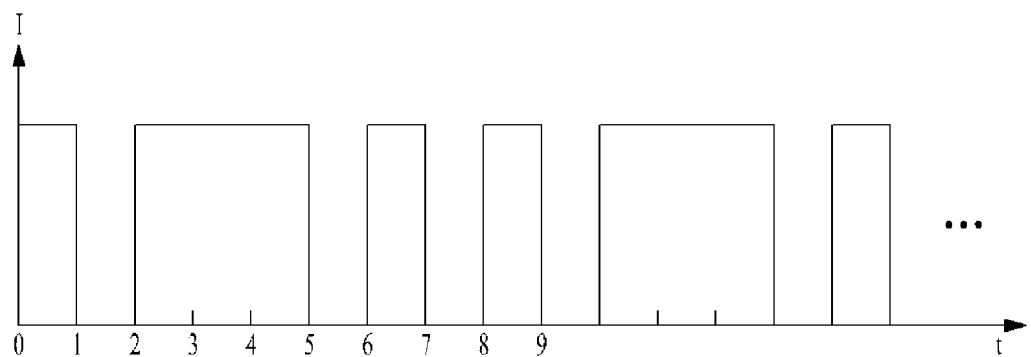
FIGS. 2A, 2B, and 2C illustrate a method for applying DC to the portable device according to an embodiment.

Referring to FIG. 2a, the portable device may generate a first electromagnetic pattern by applying a first DC pattern to the earphone. The portable device may repeatedly generate the first DC pattern every 8 unit times. To create the first DC pattern, the portable device may apply DC to the earphone from unit time 0 to unit time 1, from unit time 2 to unit time 5, and from unit time 6 to unit time 7, while the portable device may block DC to the earphone from unit time 1 to unit time 2, from unit time 5 to unit time 6, and from unit time 7 to unit time 8. The portable device may generate the first DC pattern by repeating the DC applying method used for unit time 0 to unit time 8 after unit time 8. The generation period of the first DC pattern is 8 unit times and the duration of DC is 1 or 3 unit times in the first DC pattern.

Figure 2B:
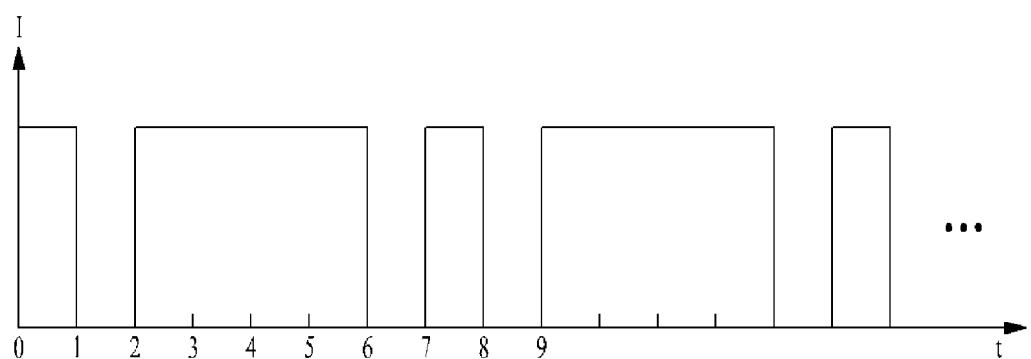

FIG. 2b illustrates a method for generating a second DC pattern that is different from the first DC pattern in terms of the generation period and duration of DC. Referring to FIG. 2b, the portable device may generate a second electromagnetic pattern by applying the second DC pattern to the earphone. The portable device may repeatedly generate the second DC pattern every 7 unit times. To generate the second DC pattern, the portable device may apply DC to the earphone from unit time 0 to unit time 1 and from unit time 2 to unit time 6, while the portable device may block DC to the earphone from unit time 1 to unit time 2 and from unit time 6 to unit time 7. The portable device may generate the second DC pattern by repeating the DC applying method used for unit time 0 to unit time 7 after unit time 7. The generation period of the first DC pattern is 7 unit times and the duration of DC is 1 or 4 unit times in the second DC pattern.

Figure 2C:
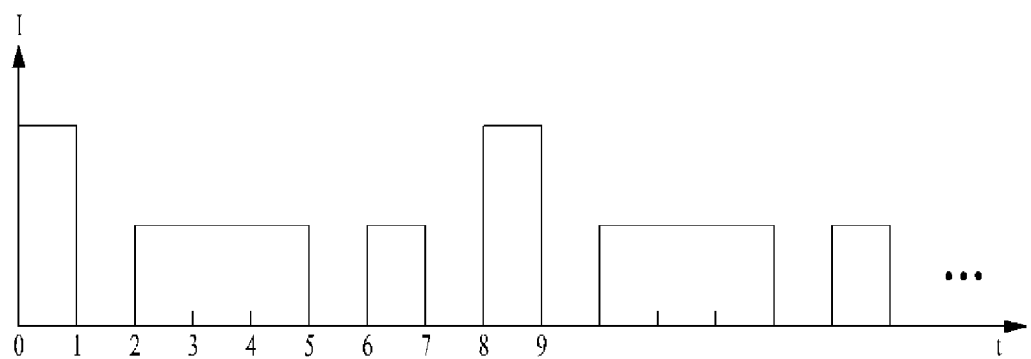

FIG. 2c illustrates a method for generating a third DC pattern that differs partially from the first DC pattern in terms of the magnitude of DC. Referring to FIG. 2c, the portable device may generate a third electromagnetic pattern by applying the third DC pattern to the earphone. The portable device may repeatedly generate the third DC pattern every 8 unit times. To generate the third DC pattern, the portable device may apply DC to the earphone from unit time 0 to unit time 2, from unit time 2 to unit time 5, and from unit time 6 to unit time 7. Compared to the first DC pattern, the portable device may reduce the magnitude of DC applied from unit time 2 to unit time 5 and from unit time 6 to unit time 7 to a half of the magnitude of DC in the first DC pattern. In this manner, the third DC pattern different from the first DC pattern may be generated.

The portable device may block DC to the earphone from unit time 1 to unit time 2, from unit time 5 to unit time 6, and from unit time 7 to unit time 8. The portable device may generate the third DC pattern by repeating the DC applying method used from unit time 0 to unit time 8 after unit time 8. The third DC pattern may partially have a half of the magnitude of DC in the first DC pattern.

As described before, the portable device may generate a different DC pattern by changing at least one of the generation period, duration, and magnitude of DC applied to the earphone. Further, the portable device may generate a different electromagnetic pattern by applying a different DC pattern to a coil of the earphone. If a plurality of portable devices are present, each portable device may provide its ID to an external device by generating a different electromagnetic pattern. The external device may acquire the IDs of the portable devices from different electromagnetic patterns and thus may transmit data to a desired portable device.

Figure 3A:
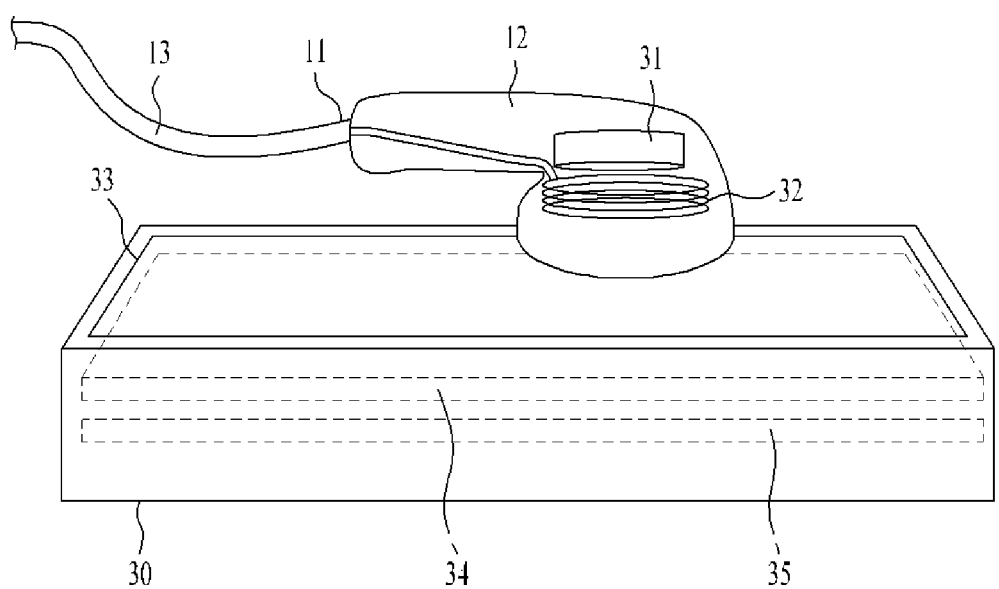
FIGS. 3A and 3B illustrate a method for recognizing an electromagnetic pattern in a display device and a magnetic field according to an embodiment.
Figure 3B:
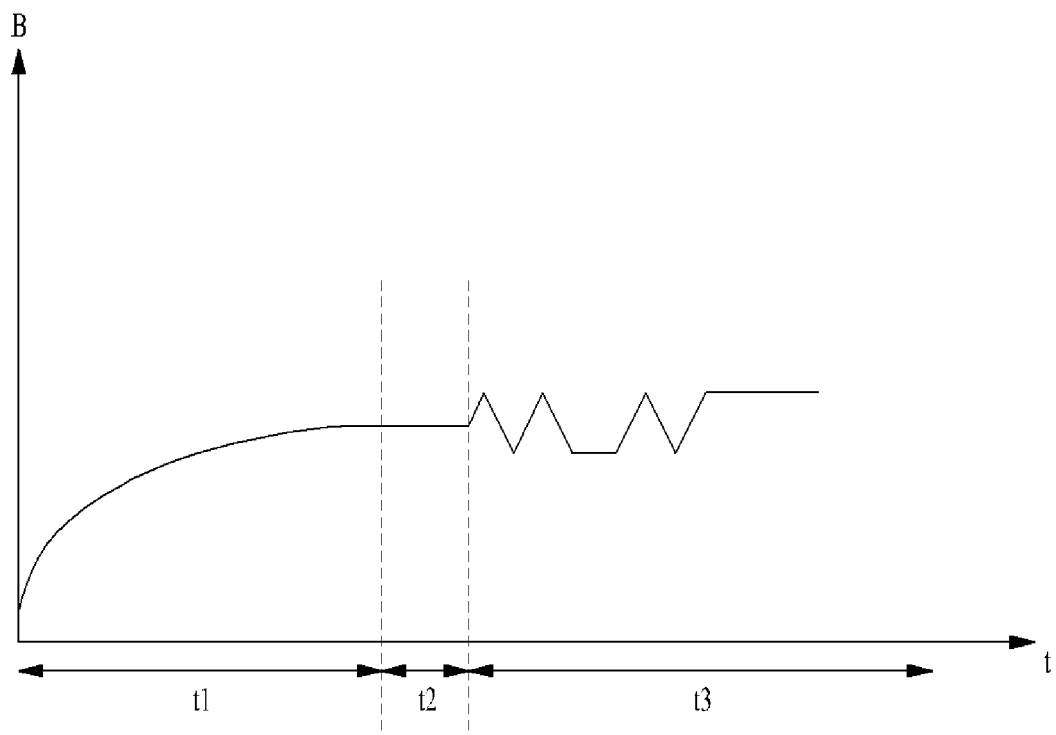

FIG. 3 illustrates a method for recognizing an electromagnetic pattern in a display device and a magnetic field according to an embodiment. Referring to FIG. 3a, the portable device may generate an electromagnetic pattern corresponding to its ID for a display device through the earphone connected to the portable device. The display device may acquire the ID of the portable device by sensing the electromagnetic pattern generated from the earphone connected to the portable device. Further, the display device may sense the position of the earphone on the display device by sensing a magnetic field of a magnet of the earphone connected to the portable device. FIG. 3b illustrates a magnetic field sensed by the display device.

The earphone 11 connected to the portable device may include a unit 12 and the cable 13. The unit 12 of the earphone 11 may include a magnet 31 and a coil 32. As described before with reference to FIGS. 1 and 2, the portable device may generate an electromagnetic pattern by applying DC to the coil 32 through the cable 13. The electromagnetic pattern may correspond to the ID of the portable device.

When the earphone 11 connected to the portable device approaches a display device 30, the display device 30 may sense the position of the earphone 11 by sensing a magnetic field generated from the magnet 31 of the earphone 11 in the disclosure. The moment the unit 12 of the earphone 11 is brought into contact with a display unit 33, the display device 30 may sense that the unit 12 of the earphone 11 is within a detection area of the display unit 33.

The display device 30 may acquire the ID of the portable device by sensing an electromagnetic pattern generated from the coil 32 of the earphone 11. The display device 30 may include the display unit 33, an electromagnetic pattern sensing unit 34 for sensing the electromagnetic pattern of the portable device, and a sensor unit 35 for sensing the magnetic field of the magnet 31 of the earphone 11.

The display device 30 may set the sensing coverage of the electromagnetic pattern sensing unit 34 to the entire area of the display unit 33 in order to sense the electromagnetic pattern of the earphone 11 within a detection area of the display unit 33. In another embodiment, the display device 30 may set the sensing coverage of the electromagnetic pattern sensing unit 34 to a partial area of the display unit 33. In addition, the display device 30 may set the sensing coverage of the sensor unit 35 in correspondence with the display unit 33 in order to sense the position of the earphone 11 on the display unit 33. The display device 30 may sense the position of the earphone 11 based on the sensing coverage of the sensor unit 35 corresponding to the area of the display unit 33. The display device 30 may transmit data corresponding to a Graphic User Interface (GUI) displayed at the sensed position of the earphone 11 to the portable device. Data transmitted by the display device will be described later with reference to FIG. 5.

In an embodiment, the electromagnetic pattern sensing unit 34 and the sensor unit 35 may be incorporated into a single magnetic sensor unit. If a geomagnetic sensor is included in the display device 30, the display device 30 may sense a magnetic field generated the magnet 31 and an electromagnetic pattern generated from the coil 32 using the geomagnetic sensor.

FIG. 3b is a graph illustrating changes of a magnetic field sensed by the display device according to an embodiment. In FIG. 3b, the vertical axis represents the strength of the magnetic field and the horizontal axis represents time. The magnetic field sensed by the display device may get stronger during time period t1. When the earphone connected to the portable device approaches the display device, the display device may sense a magnetic field generated from a magnet of the earphone. As the distance between the display device and the earphone gets narrower, the display device may sense an increasing strength of the magnetic field.

The strength of the magnetic field sensed by the display device may be kept constant during time period t2. If the earphone connected to the portable device is apart from the display device by a constant distance, the display device may sense that the strength of the magnetic field is kept constant. For example, when the earphone contacts the display device, the earphone cannot be closer to the display device. Therefore, the magnetic field sensed by the display device has a constant strength.

The strength of the magnetic field sensed by the display device may increase and decrease alternately during time period t3. Once an electromagnetic pattern is generated from the earphone connected to the portable device, the display device may sense the electromagnetic pattern. The strength of the magnetic field sensed by the display device may increase or decrease according to the direction or magnitude of current applied by the portable device.

For example, if the portable device applies a forward current or increases a current magnitude, the strength of the magnetic field sensed by the display device may increase. In contrast, if the portable device applies a reverse current or decreases a current magnitude, the strength of the magnetic field sensed by the display device may decrease. If the portable device applies current in a constant direction or at a constant magnitude level, the strength of the magnetic field sensed by the display device may be kept constant.

As described before, the display device may detect an electromagnetic pattern generated from the earphone by sensing the afore-described increasing and decreasing strength of a magnetic field.

Figure 4:
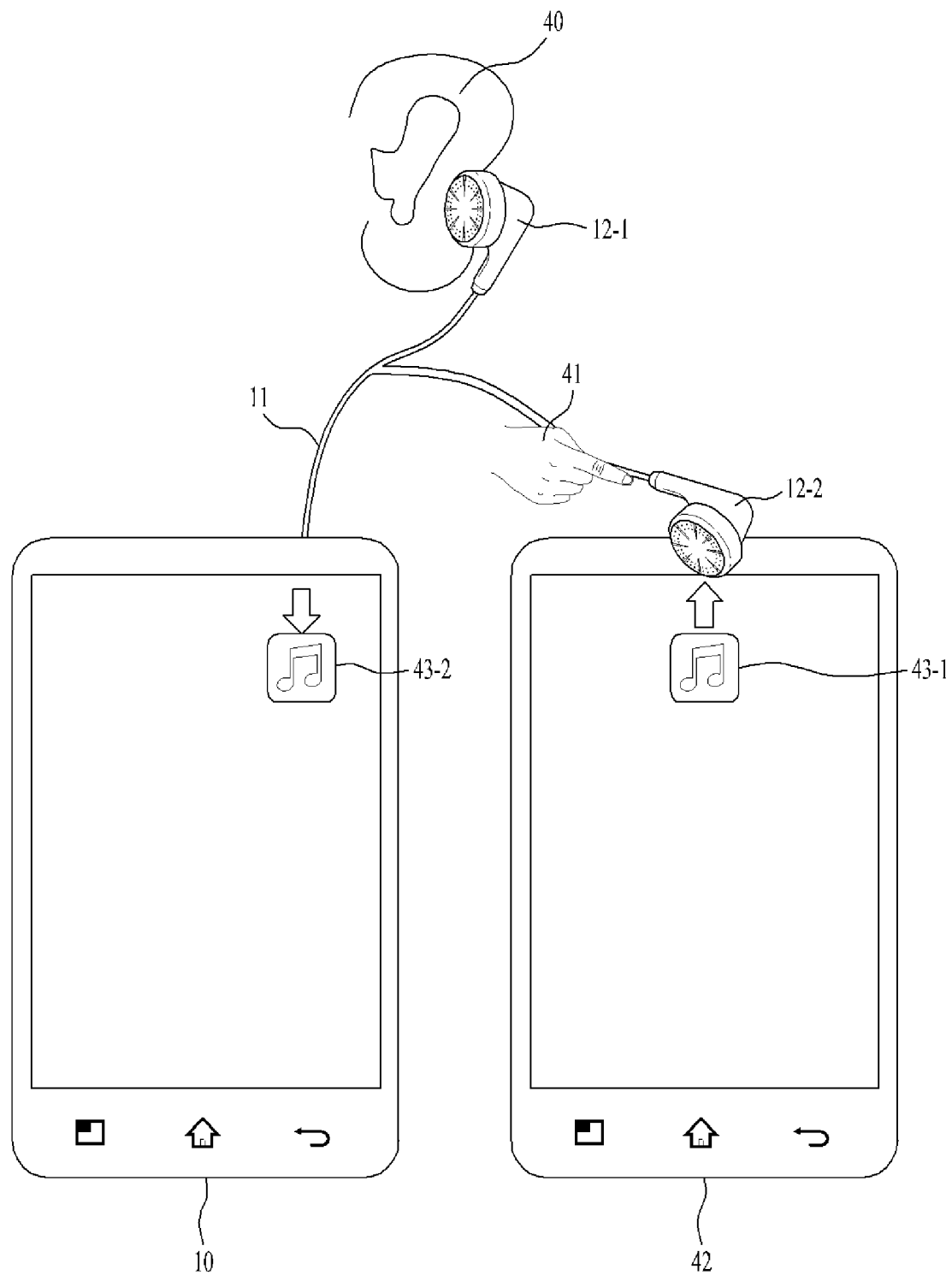
FIG. 4 illustrates a method for operating an earphone according to an embodiment.

FIG. 4 illustrates a method for operating the earphone according to an embodiment. The portable device 10 may be connected to the earphone 11. The portable device 10 may control the output of the earphone 11 adaptively according to the operation state of the earphone 11. If a user wears a unit of the earphone 11 in an ear, the portable device 10 may output sound through the unit of the earphone 11. If a unit of the earphone 11 is removed from the user's ear, the portable device 10 may generate an electromagnetic pattern through the unit of the earphone apart from the ear.

In FIG. 4, the portable device 10 may be connected to the earphone 11. The portable device 10 may sense whether the units 12-1 and 12-2 of the earphone 11 are worn in the ears 40 of a user or removed from the ears 40 of the user. The portable device 10 may sense that the left unit 12-1 of the earphone 11 is worn in an ear 40 of a user by means of the sensor unit. The portable device 10 may further sense that the user has removed the right unit 12-2 of the earphone 11 from the ear 40 with his or her hand, by means of the sensor unit.

The portable device 10 may output sound through the left unit 12-1 worn in the ear 40 of the user by applying AC to the left unit 12-1. The portable device 10 may output the left sound of stereo sound through the left unit 12-1. In an embodiment, the portable device 10 may output both the left and right sounds of the stereo sound in combination through the left unit 12-1. Even though the user wears only the left unit 12-1, the user can hear the left and right sounds of the stereo sound.

The portable device 10 may generate an electromagnetic pattern by applying DC to the right unit 12-2 removed from the ear 40 of the user. The portable device 10 may generate an electromagnetic pattern corresponding to the ID of the portable device 10 through the right unit 12-2. The portable device 10 may transmit the ID of the portable device 10 to an external device 42 by the electromagnetic pattern generated through the right unit 12-2. The external device 42 may be another portable device or a display device as described before with reference to FIG. 3a.

The external device 42 may transmit data in response to the acquired ID of the portable device 10. The external device 42 may sense the position of the unit 12-2 of the earphone 11 connected to the portable device 10. The external device 42 may transmit data corresponding to a GUI touched by the unit 12-2 of the earphone 11 to the portable device 10 according to the sensed position of the earphone 11. For example, if the earphone 11 touches a GUI 43-1 of a music file displayed on the external device 42, the external device 42 may transmit the music file corresponding to the GUI 43-1 to the portable device 10. The external device 42 may use streaming in transmitting the music file to the portable device 10. The external device 42 may display the graphic effect that the GUI 43-1 of the music file transmitted to the portable device 10 disappears into the touched area of the unit 12-2 of the earphone 11.

The portable device 10 may receive the data from the external device 42. The portable device 10 may display a GUI of the received data. For example, upon receipt of the music file from the external device 42, the portable device 10 may indicate data reception by displaying a GUI 43-2 of the received music file. Or the portable device 10 may display the GUI 43-2 of the received music file on a connector connecting between the portable device 10 and the earphone 11. The portable device 10 may display the graphic effect that the GUI 43-2 of the received music file is being input to the portable device 10 through the earphone connector.

The portable device 10 may output the data received from the external device 42. For example, if the received data is visual data, the portable device 10 may display the received visual data on a display unit. If the received data is audible data, the portable device 10 may output the audible data through a speaker or the connected earphone. If the received data is tactile data, the portable device 10 may generate a tactile feedback for the received tactile data by means of a tactile feedback unit.

Figure 5:
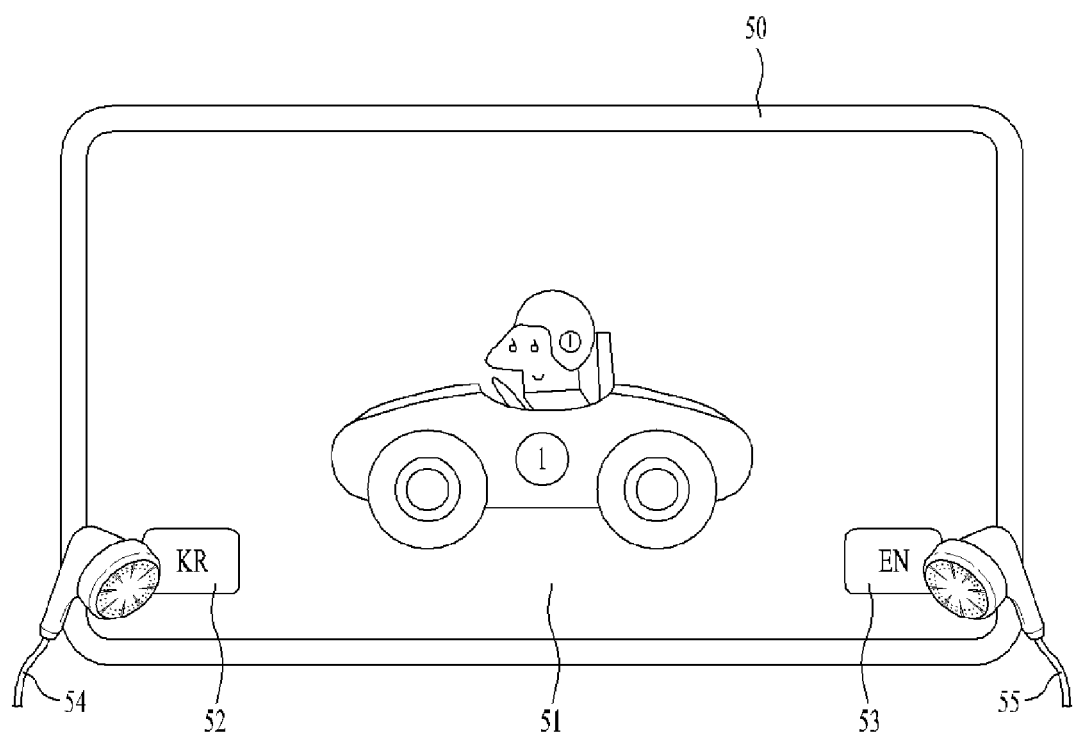
FIG. 5 illustrates a method for determining transmission data in correspondence with the position of an earphone according to an embodiment.

FIG. 5 illustrates a method for determining transmission data in correspondence with the position of the earphone according to an embodiment. A display device may display a GUI. The display device may determine transmission data in correspondence with the sensed position of the earphone on the displayed GUI.

Referring to FIG. 5, a display device 50 may display GUIs. The display device 50 may display the GUIs along with digital content 51 such as a movie or an animation. For example, when the display device 50 displays a movie that offers a plurality of language options, the display device 50 may display GUIs 52 and 53 corresponding to the plurality of language options. In the illustrated case of FIG. 5, the display device 50 may provide the first GUI 52 corresponding to Korean and the second GUI 53 corresponding to English as language options for images of the digital content 51.

The display device 50 may detect a first earphone 54 of a first external device at a displayed position of the first GUI 52. The first external device may be the afore-described portable device. The display device 50 may sense a first electromagnetic pattern received through the first earphone. The display device 50 may acquire the ID of the first external device from the sensed first electromagnetic pattern. The display device 50 may determine data to be transmitted to the first external device in correspondence with the GUI displayed at the detected position of the first earphone 54. That is, the display device 50 may transmit Korean data of the digital content 51 to the first external device in correspondence with the first GUI 52 displayed at the detected position of the first earphone 54. The display device 50 may adopt streaming in transmitting the Korean data to the first external device. If the digital content 51 does not include the Korean data, the display device 50 may translate data of another language into Korean data and transmit the Korean data. Accordingly, the first external device may output the digital content 51 in a Korean version.

The display device 50 may detect a second earphone 55 of a second external device at a displayed position of the second GUI 53. The second external device may be the afore-described portable device. The display device 50 may sense a second electromagnetic pattern received through the second earphone. The display device 50 may acquire the ID of the second external device from the sensed second electromagnetic pattern. The display device 50 may determine data to be transmitted to the second external device in correspondence with the GUI displayed at the detected position of the second earphone 55. That is, the display device 50 may transmit English data of the digital content 51 to the second external device in correspondence with the second GUI 53 displayed at the detected position of the second earphone 55. The display device 50 may adopt streaming in transmitting the English data to the second external device. If the digital content 51 does not include the English data, the display device 50 may translate data of another language into English data and transmit the English data to the second external device. Accordingly, the second external device may receive the English data and output the digital content 51 in an English version.

As described above, the display device 50 may determine the language of data to be transmitted to an external device in correspondence with the detected position of an earphone of an external device. If the display device 50 detects a plurality of earphones, the display device 50 may transmit data in a language corresponding to the detected position of each earphone to a device connected to the earphone. Accordingly, if two users view the digital content 51 on one display device 50, they may view the digital content 51 in different languages.

Figure 6:
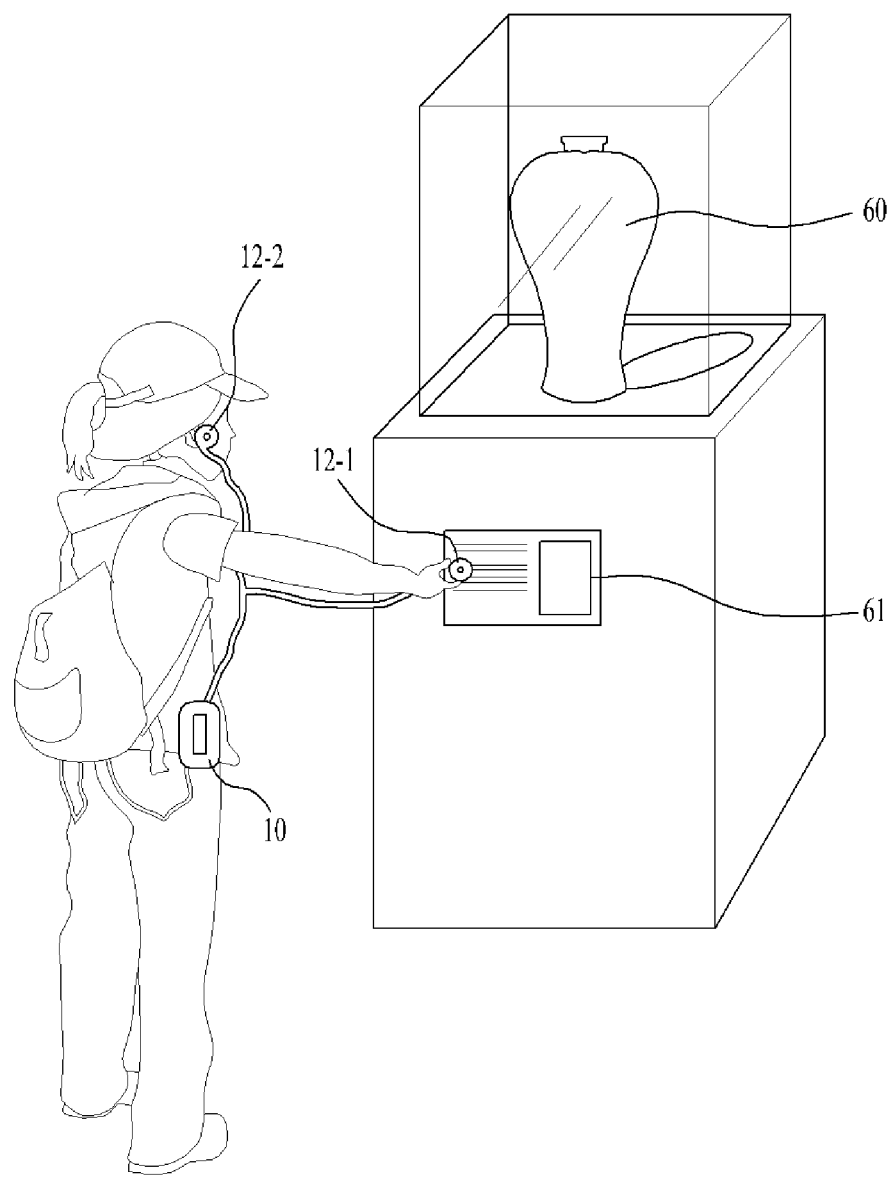
FIG. 6 illustrates data transmission between the portable device and the display device according to an embodiment.

FIG. 6 illustrates data transmission between a portable device and a display device according to an embodiment. The display device may include a kiosk in the disclosure. The display device may take the form of a kiosk to provide guidance on items exhibited in a museum. A user may visit the museum, carrying the portable device 10. To receive guidance on details of exhibited items, the user may touch a display device 61 with the earphone connected to the portable device 10. A method for operating each device in this situation will be described below.

The portable device 10 may sense removal of the left unit 12-1 of the earphone 11 from an ear of the user. The portable device 10 may generate an electromagnetic pattern corresponding to the ID of the portable device 10 by applying DC to the left unit 12-1.

The display device 61 may display information about an exhibited item 60. The display device 61 may detect the left unit 12-1 of the earphone 11 connected to the portable device 10. The display device 61 may sense an electromagnetic pattern generated from the left unit 12-1. The display device 61 may acquire the ID of the portable device 10 from the sensed electromagnetic pattern. The display device 61 may determine data to be transmitted to the portable device 10 in correspondence with a GUI displayed at the detected position of the left unit 12-1 of the earphone 11. The display device 61 may transmit the data to the detected ID of the portable device 10. The display device 61 may adopt streaming for data transmission.

The portable device 10 may receive the data from the display device 61 and output the received data. The portable device 10 may output the data through the right unit 12-2 of the earphone 11 worn in an ear of the user.

As described above, the user may listen to a description of an exhibited item by touching the display device 61 with one of the units of the earphone worn in the user's ears. Accordingly, the user may listen to the description of the exhibited item using the portable device 10 without the need for using an additional guidance device.

Figure 7:
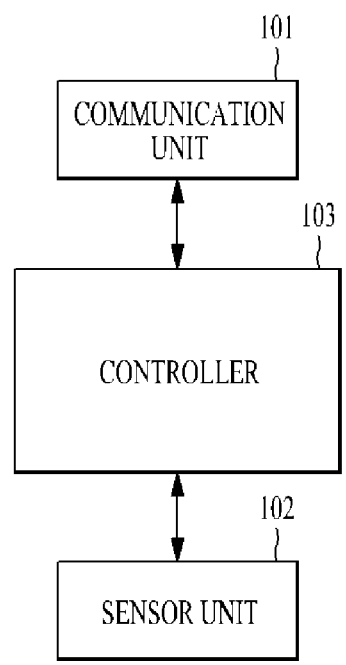
FIG. 7 is a block diagram of the portable device according to an embodiment.

FIG. 7 is a block diagram of a portable device according to an embodiment. The portable device may include a communication unit 101, a sensor unit 102, and a controller 103.

The communication unit 101 may transmit data to or receive data from an external device by communicating with the external device in conformance to various protocols. The communication unit 101 may receive data from the external device by wireless communication. The communication unit 101 may receive data from the external device by wireless communication, Wireless Local Area Network (WLAN), Bluetooth, Zigbee, and short-range communication. In the disclosure, the communication unit 101 may receive data from a display device in correspondence with the ID of the portable device. The portable device may receive the data by streaming The sensor unit 102 may sense whether the earphone connected to the portable device is worn in the ears of the user or removed from the ears of the user. The sensor unit 102 may sense whether each of the left and right units of the earphone is apart from an ear of the user by means of a contact sensor included in at least one of the left and right units of the earphone. The sensor unit 102 may transmit information indicating the presence or absence of an earphone unit in an ear of the user to the controller 103.

The controller 103 may receive the information indicating whether an earphone unit has been removed from an ear of the user from the sensor unit 102. The controller 103 may apply DC having a pattern to the earphone unit apart from the user's ear. That is, the controller 103 may apply a DC pattern corresponding to the ID of the portable device to the earphone unit removed from the user's ear, as described before with reference to FIG. 2. Thus, the controller 103 may generate an electromagnetic pattern corresponding to the ID of the portable device using the coil of the earphone unit. In addition, the controller 103 may receive data through the communication unit 101. The controller 103 may receive data from an external device in correspondence with the ID of the portable device. In the disclosure, the controller 103 may receive data from a display device through the communication unit 101 in correspondence with the ID of the portable device.

FIG. 7 is a block diagram according to an embodiment and separately shown blocks are logically distinguished elements of the portable device in FIG. 7. Therefore, two or more elements of the portable device may be implemented into one or more chips according to the design of the portable device.

Besides the elements illustrated in FIG. 7, the portable device according to the embodiment may further include a display unit, an audio output unit, and a tactile feedback unit. If the portable device receives visual data through the communication unit 101, the portable device may display the visual data on the display unit. If the portable device receives audible data through the communication unit 101, the portable device may output the audible data through the audio output unit. If the portable device receives tactile data through the communication unit 101, the portable device may generate a tactile feedback corresponding to the tactile data through the tactile feedback unit.

Figure 8:
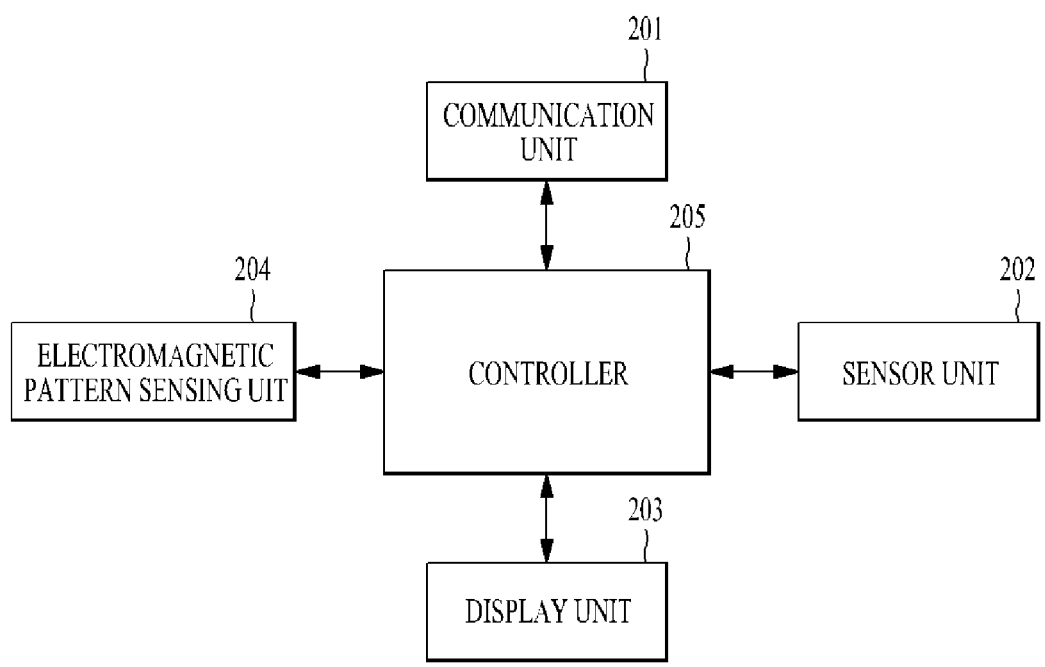
FIG. 8 is a block diagram of the display device according to an embodiment.

FIG. 8 is a block diagram of a display device according to an embodiment. The display device may include a communication unit 201, a sensor unit 202, a display unit 203, an electromagnetic pattern sensing unit 204, and a controller 205.

The communication unit 201 may transmit data to or receive data from an external device by communicating with the external device in conformance to various protocols. The communication unit 201 may receive data from the external device by wireless communication. The communication unit 201 may receive data from the external device by wireless communication, WLAN, Bluetooth, Zigbee, and short-range communication. In the disclosure, the communication unit 201 may transmit data to a portable device in correspondence with the ID of the portable device acquired from an electromagnetic pattern. The display device may transmit the data by streaming The sensor unit 202 may sense the position of a unit of an earphone connected to the external device on the display unit 203 by means of a magnetic sensor. The sensor unit 202 may sense a magnetic field of a magnet included in the earphone unit. The sensor unit 202 may use a geomagnetic sensor to sense the magnetic field of the magnet included in the earphone unit. The sensor unit 202 may provide information about the sensed magnetic field of the earphone to the controller 205 and the controller 205 may detect the position of the earphone based on the received information about the magnetic field of the earphone.

The display unit 203 may display GUIs. The earphone of the external device may approach or touch the display unit 203. The display unit 203 may include an Organic Light Emitting Diode (OLED), a Liquid Crystal Display (LCD), an electronic ink, and a flexible display. The controller 205 may sense the position of the earphone connected to the external device on the display unit 203 by means of the sensor unit 202 and the display unit 203 and may detect a GUI displayed at the sensed position of the earphone. Thus, the controller 205 may determine data to be transmitted to the external device based on the GUI displayed at the position of the earphone.

The electromagnetic pattern sensing unit 204 may sense an electromagnetic pattern generated from the coil of the unit of the earphone connected to the external device. The electromagnetic pattern sensing unit 204 may use a geomagnetic sensor in order to sense the electromagnetic pattern of the coil included in the earphone unit. The electromagnetic pattern sensing unit 204 may provide information about the sensed electromagnetic pattern to the controller 205 and the controller 205 may acquire the ID of the external device based on the received information about the electromagnetic pattern. In an embodiment, the electromagnetic pattern sensing unit 204 may be incorporated into the afore-described sensor unit 202 in the display device.

The controller 205 may display digital content and GUIs on the display unit 203. The controller 205 may also sense the position of the earphone approaching the display unit 203 of the display device by means of the sensor unit 202. The earphone is connected to the external device. The controller 205 may determine data to be transmitted to the external device based on a displayed GUI and the position of the earphone. The controller 205 may sense the electromagnetic pattern generated from the earphone by means of the electromagnetic pattern sensing unit 204. The controller 205 may acquire the ID of the external device from the sensed electromagnetic pattern. The controller 205 may transmit the determined data to the ID of the external device by means of the communication unit 201.

FIG. 8 is a block diagram according to an embodiment and separately shown blocks are logically distinguished elements of the display device in FIG. 8. Therefore, two or more elements of the display device may be implemented into one or more chips according to the design of the display device.

Figure 9:
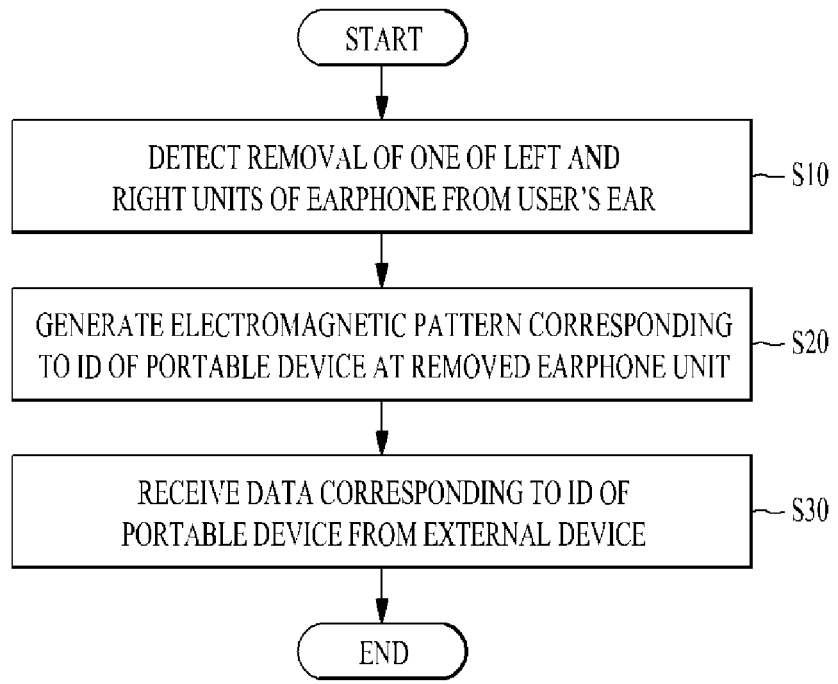
FIG. 9 is a flowchart illustrating a method for controlling the portable device according to an embodiment.

FIG. 9 is a flowchart illustrating a method for controlling the portable device according to an embodiment. The portable device may detect removal of one of the left and right units of the earphone from an ear of the user (S10). As described before with reference to FIG. 4, the earphone may sense removal of the earphone unit from the user's ear using at least one of a contact sensor, an infrared sensor, and a proximity sensor. The earphone may provide the sensed result to the sensor unit of the portable device through the cable. The portable device may determine whether the unit of the earphone connected to the portable device has been removed from the user's ear.

The portable device may generate an electromagnetic pattern corresponding to the ID of the portable device at the earphone unit removed from the user's ear by means of the controller (S20). The portable device may apply DC to the earphone. The portable device may apply DC to the removed earphone unit through the cable of the earphone and the coil of the removed earphone unit may generate an electromagnetic field by the DC. The portable device may apply the DC in a pattern.

As described before with reference to FIG. 2, the portable device may apply a DC pattern to the earphone so that the removed earphone unit may generate an electromagnetic pattern. The portable device may apply the DC pattern in correspondence with the ID of the portable device and thus the removed earphone unit may generate an electromagnetic pattern. The portable device may provide its ID to an external device by generating the electromagnetic pattern at the removed unit of the earphone. The portable device may output sound by applying AC to a unit of the earphone worn in an ear of the user.

The portable device may receive data from the external device through the communication unit in correspondence with the ID of the portable device (S30). As described with reference to FIGS. 4, 5 and 6, upon receipt of the ID of the portable device by the electromagnetic pattern, the external device may transmit data in correspondence with the ID of the portable device. The portable device may receive the data from the external device and output the received data. If the received data is audible data, the portable device may output the audible data to the earphone unit worn in the user's ear.

The portable device may output the received audible data to the worn earphone unit by applying AC to the worn earphone unit. If the received audible data is stereo sound, the portable device may output the left and right sounds of the stereo sound in combination to the worn earphone unit. Thus, the portable device may output both the left and right sounds of the stereo sound just through one earphone unit.

FIG. 10 is a flowchart illustrating a method for controlling a display device according to an embodiment. The display device may display GUIs on the display unit (S110). As described before with reference to FIG. 5, the display device may display digital content on the display unit and may display GUIs according to the digital content on the display unit. The display device may indicate to the user that data can be transmitted and received through an earphone by a displayed GUI.

The display device may sense an earphone approaching the display unit by means of the sensor unit (S120). As described before with reference to FIG. 3, when an earphone connected to an external device approaches the display unit, the display device may sense a magnetic field generated from a magnet included in the earphone. The display device may detect the position of the earphone on the display unit by analyzing the sensed magnetic field. The display device may use a geomagnetic sensor to sense the magnetic field of the earphone.

The display device may sense an electromagnetic pattern of the earphone within a detection area of the display unit by means of the electromagnetic pattern sensing unit (S130). As described before with reference to FIG. 3, the display device may sense the electromagnetic pattern of the earphone by means of the electromagnetic pattern sensing unit. The display device may sense an electromagnetic field generated from the earphone and a changing pattern of the electromagnetic field, thereby sensing the electromagnetic pattern. Since the electromagnetic pattern is generated in correspondence with the ID of the external device connected to the earphone, the display device may sense a different electromagnetic pattern from an earphone connected to a different external device.

The display device may acquire the ID of the external device connected to the earphone from the sensed electromagnetic pattern using the controller (S140). As described with reference to FIG. 3, the display device may acquire the ID of the external device, corresponding to the sensed electromagnetic pattern. In an embodiment, the display device may pre-store the IDs of external devices corresponding to electromagnetic patterns. In another embodiment, the display device may acquire the ID of an external device from a sensed electromagnetic pattern according to a rule of translating an electromagnetic pattern to numbers or characters.

The display device may transmit data to the external device identified by the acquired ID through the communication unit (S150). As described before with reference to FIGS. 4 and 5, the display device may determine transmission data in correspondence with the sensed position of the earphone and a GUI displayed at the sensed position of the earphone on the display unit. The display device may transmit the determined transmission data to the acquired ID of the external device. The display device may adopt streaming in transmitting the determined transmission data.

As described with reference to FIGS. 9 and 10, the portable device and the display device may exchange data with each other through an earphone. That is, the portable device and the display device may be connected to each other and transmit to or receive data from each other just by bringing the earphone connected to the portable device toward the display device, without the need for an additional connection setup between the two devices.

As is apparent from the above description, a portable device can transmit its ID to an external device through an earphone.

The portable device can generate an electromagnetic pattern using the earphone.

The portable device can output its ID using the electromagnetic pattern.

The portable device can receive data from the external device.

The portable device can sense wearing of the earphone in an ear of a user.

The display device may display a GUI.

The display device is connected to an external device and can sense an earphone approaching the display device.

The display device can sense an electromagnetic pattern of the earphone connected to the external device and thus can acquire the ID of the external device.

The display device can transmit data to the external device using the ID of the external device.

It will be apparent to those skilled in the art that various modifications and variations can be made in the disclosure without departing from the spirit or scope of the disclosure. Thus, it is intended that the disclosure covers the modifications and variations of this disclosure provided they come within the scope of the appended claims and their equivalents.

What is claimed is:

1. A portable device connected to an earphone having a coil, the portable device comprising:
   a sensor unit configured to sense whether the earphone is worn by a user;
   a communication unit configured to transmit data to and receive data from an external device; and
   a controller configured to:
      sense removal of a first unit of the earphone from an ear of the user, the first unit being one of left and right units of the earphone,
      generate an electromagnetic pattern corresponding to an Identifier (ID) of the portable device at the first unit, and
      receive data corresponding to the ID of the portable device from the external device through the communication unit.

2. The portable device according to claim 1, wherein the controller is configured to generate the electromagnetic pattern by applying a direct current(DC) to the coil of the earphone.

3. The portable device according to claim 2, wherein the controller is configured to generate the electromagnetic pattern by changing at least one of a magnitude and an application period of the DC.

4. The portable device according to claim 1, wherein the controller is further configured to output the data received from the external device.

5. The portable device according to claim 4, wherein if the received data is audible data, the controller is configured to output both left and right sounds of the audible data through a second unit being the other unit between the left and right units of the earphone, worn in an ear of the user.

6. The portable device according to claim 4, further comprising a display unit configured to display a Graphic User Interface (GUI), wherein if the received data is visual data, the controller is configured to output the visual data via the display unit.

7. The portable device according to claim 4, further comprising a tactile feedback unit configured to output a tactile feedback, wherein if the received data is tactile data, the controller is configured to output the tactile data via the tactile feedback unit.

8. The portable device according to claim 1, further comprising:
a connector configured to allow the earphone to plug in; and
a display unit configured to display a GUI,
wherein the controller is further configured to display a reception state of the received data as a GUI in correspondence with a position of the connector.

9. The portable device according to claim 1, wherein the portable device includes at least one of a smart phone, a smart pad, a music player, a laptop computer, or a tablet computer.

10. A display device comprising:
a display unit configured to display a Graphic User Interface (GUI);
an electromagnetic pattern sensing unit configured to sense an electromagnetic pattern;
a sensor unit configured to sense an earphone within a detection area of the display unit;
a communication unit configured to transmit data to and receive data from an external device; and
a controller configured to:
display the GUI on the display unit,
sense the earphone within a detection area of the display unit via the sensor unit,
sense an electromagnetic pattern of the earphone within a detection area of the display unit via the electromagnetic pattern sensing unit,
acquire an Identifier (ID) of the external device connected to the earphone from the sensed electromagnetic pattern, and
transmit data to the external device identified by the acquired ID of the external device through the communication unit.

11. The display device according to claim 10, wherein the controller is further configured to detect a position of the earphone on the display unit via the sensor unit.

12. The display device according to claim 11, wherein the controller is configured to detect the position of the earphone by sensing a magnetic field of a magnet included in the earphone via the sensor unit.

13. The display device according to claim 11, wherein the controller is configured to transmit data corresponding to the detected position of the earphone to the external device.

14. The display device according to claim 13, wherein the controller is configured to transmit data corresponding to the GUI displayed at the detected position of the earphone to the external device.

15. The display device according to claim 11, wherein if the data is audible data, the controller is further configured to translate the audible data into a language corresponding to the detected position of the earphone and to transmit the translated audible data to the external device.

16. The display device according to claim 10, wherein the electromagnetic pattern sensing unit is configured to sense the electromagnetic pattern of the earphone within a detection area of the display unit using a geomagnetic sensor.

17. The display device according to claim 10, wherein the controller is configured to sense that the earphone is within a detection area of the display unit, when the earphone contacts the display unit.

18. The display device according to claim 10, wherein the display device includes at least one of a smart phone, a smart pad, a tablet computer, a kiosk, a wall display, a music player, a desktop computer, a smart table, a TV, and a laptop computer.

19. A method for controlling a display device, the method comprising:
displaying a Graphic User Interface (GUI) on a display unit;
sensing an earphone within a detection area of the display unit via a sensor unit;
sensing an electromagnetic pattern of the earphone within a detection area of the display unit via an electromagnetic pattern sensing unit;
acquiring an Identifier (ID) of an external device connected to the earphone from the sensed electromagnetic pattern using a controller; and
transmitting data to the external device identified by the acquired ID of the external device through a communication unit.

* * * * *